United States Patent [19]

Laude et al.

[11] 3,942,048
[45] Mar. 2, 1976

[54] PIEZOELECTRICALLY DRIVEN OPTICAL GRATING ASSEMBLIES

[75] Inventors: Jean Pierre Laude, Ballainvilliers; Guy Pieuchard, Fontenay-le-Fleury, both of France

[73] Assignee: Jobin-Yvon, Longjumeau, France

[22] Filed: Nov. 25, 1974

[21] Appl. No.: 526,881

[30] Foreign Application Priority Data
Nov. 29, 1973  France .............................. 73.42509

[52] U.S. Cl. ...................... 310/8.1; 310/8; 310/8.3; 250/237 G
[51] Int. Cl.² .......................................... H01L 41/08
[58] Field of Search .................. 310/8, 8.1, 8.2, 8.3; 250/216, 237 R, 237 G

[56] References Cited
UNITED STATES PATENTS 3,302,027  1/1967  Fried et al. ...................... 310/8.1 X
3,497,826  2/1970  Foster ........................... 310/8.1 UX
3,555,453  1/1971  Littauer .......................... 310/8.1 X

*Primary Examiner*—Mark O. Budd
*Attorney, Agent, or Firm*—Alan H. Levine

[57] ABSTRACT

An optical grating assembly comprises a piezo-electric substrate which supports on two opposite faces thereof respective metallic layers. One of these faces of the substrate also carries a grating either formed in that face, in the metal layer supported by that face, or in a resin layer carried by that face. Application of a variable voltage between the metal layers sets up an electric field of variable strength in the substrate and this results in the pitch of the grating being variable due to the piezo-electric nature of the substrate.

7 Claims, 6 Drawing Figures

PIEZOELECTRICALLY DRIVEN OPTICAL GRATING ASSEMBLIES

BACKGROUND OF THE INVENTION

1. Field of the Invention

This invention relates to an optical grating assembly wherein the grating pitch is variable.

2. Summary of the Prior Art

It has been previously proposed to provide an optical grating and a piezo-electric element in a device forming a modulator and comprising a piezo-electric crystal on one mirror face of which is engraved a grating. The crystal is excited by means of two electrodes applied to two other faces of the grating, these two other faces facing each other and being perpendicular to the engraced face. This device is arranged to vary the pitch of the grating about a mean value, the modulation of the spacing between the lines of the grating causing a corresponding modulation of a light beam diffracted by the grating. In order to excite the crystal, it is necessary to apply a very high voltage of the order of 10,000 volts.

This previously proposed modulator is disadvantageous owing to the very high voltages required to operate it and its limited range of grating pitch variations.

It is an object of the present invention to provide an improved variable pitch optical grating. It is a further object to provide an optical grating assembly for use in industry at readily available voltages.

SUMMARY OF THE INVENTION

According to the invention there is provided an optical grating assembly comprising a substrate possessing piezo-electric properties and having two opposite faces, electrically-conductive layers each carried by a respective one of said faces of the substrate such that application of a variable voltage between these layers sets up in the substrate an electric field of variable strength, and a grating carried by one of the said two opposite faces of the substrate, the said electric field of variable strength causing, as a result of the piezo-electric properties of the substrate, corresponding variations in the pitch of the grating.

Further according to the invention there is provided an optical grating assembly comprising a substrate possessing piezo-electric properties and having a pair of opposed substantially parallel faces, a pair of opposed electrically-conductive layers, said substrate lying between the layers such that each of said layers is supported on a respective one of said faces, and means defining a grating extending generally parallel to said faces, said grating being deformed upon deformation of the substrate when a variable intensity electrical field is applied to the substrate by the conductive layers.

The grating can be obtained by engraving directly one face of the substrate.

Alternatively, as is preferred, the grating can be formed in a layer carried on one of the faces of the substrate. This layer may be in the form of an aluminum or other metallic coating which constitutes one of the conductive layers; in this case, the grating can also be formed by engraving.

In a further alternative arrangement, the grating can be formed by a holographic process in a layer of photopolymerisable resin or other photo-sensitive material. The grating can be in the form of an image.

In yet a further alternative arrangement, the grating itself constitutes one of the conductive or other layers.

BRIEF DESCRIPTION OF THE DRAWINGS

An optical grating assembly embodying the invention will now be particularly described, by way of example, with reference to the accompanying diagrammatic drawings, in which.

DESCRIPTION OF THE PREFERRED EMBODIMENTS

Figure 1:
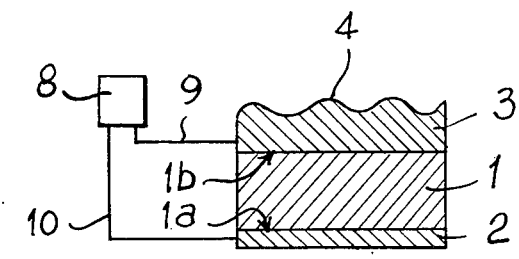
FIG. 1 is a cross-section of the grating assembly.

As shown in FIG. 1, the grating assembly comprises a substrate 1 in the form of a plate and possessing piezo-electric properties. The substrate 1 caries on one of its faces 1a an electrically-conductive layer 2, and on its opposite face 1b, which is substantially parallel to the face 1a, a reflective and electrically-conductive metal layer 3. The exposed surface of the layer 3 has been mechanically formed to provide a grating 4, which extends generally parallel to the faces 1a, 1b of the substrate.

Figure 2:
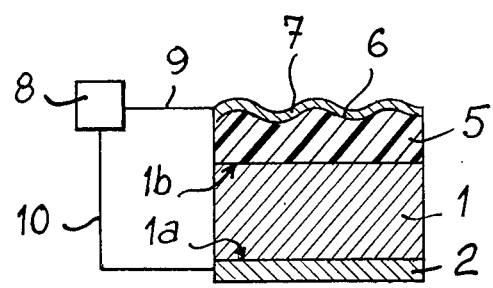
FIG. 2 is a cross-section of a modified form of the grating assembly.

In the modified form of the grating assembly (FIG. 2), the surface 1b of the substrate 1 is coated with a layer 5 of photo-polymerisable resin which has undergone a holographic process in such manner as to form a grating 6 on its surface remote from the surface 1b, the grating 6 extending substantially parallel to the faces 1a, 1b of the substrate 1. A reflective and electrically-conductive metal layer 7 is coated onto this grating surface.

The pitch of the grating 4 or 6, can be varied by applying a variable voltage of sufficient amplitude between the two electrically-conductive layers 2 and 3, or 2 and 7. This can be effected by any appropriate voltage-generating means 8, for example, by means of an ultrasonic oscillator using piezo-electric crystals. The voltage generating means 8 is connected to the grating assembly by conductors 9 and 10. Application of a voltage between the conductive layers of the grating assembly sets up an electric field in the substrate 1 which consequently distorts and alters the pitch of the grating; the voltage required can, for example, be as low as 300 volts.

Figure 3:
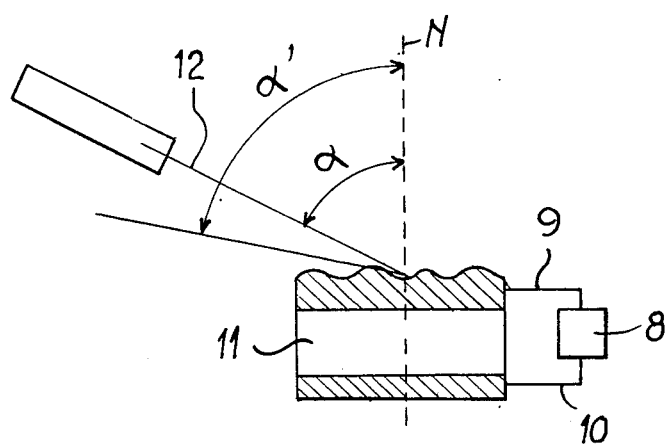
FIG. 3 is a diagram illustrating use of the grating assembly as a light-beam deflector.

FIG. 3 illustrates an application of a grating assembly 11 of the form shown in FIG. 1 for the deflection of a high-frequency light beam, for example, a laserbeam, either in a continuous manner or intermittently. Use of the grating assembly in such an application makes it possible for example, to vary the wavelength of a laser beam using only very little power.

The grating assembly 11 is so positioned that an incident laser beam 12 impinges on the grating of the grating assembly at a shallow angle of incidence $\alpha$ between 70° and 90°, preferably the angle $\alpha$ is close to 90°. The resultant diffracted beam subtends an angle $\alpha'$ with a line N (shown dashed in FIG. 3) at right angles to the plane of the grating, such that:

$$a (\sin \alpha + \sin \alpha') = k \lambda$$

wherein
a = the pitch of the grating, and
λ = wavelength of incident laser beam.
The incident beam has thus undergone deflection.

A relative grating pitch variation $da/a$, produced by utilising the piezo-electric properties of the substrate 1, gives a corresponding variation in the diffracted beam angle such that $$d\alpha' = - \frac{(\sin \alpha + \sin\alpha')}{\cos\alpha'} \frac{da}{a}$$

The relative pitch variation of the grating assembly is a characteristic of the assembly and is dependent on the piezo-electric properties of the assembly. The variation in the angle of deflection experienced by the beam 12 increases in correspondence with the magnitude of the term:

$$\frac{\sin\alpha + \sin\alpha'}{\cos\alpha'}$$

and thus is greater the closer $\alpha'$ is to 90°.

Therefore, in practice, to obtain the maximum deflection variation, beams directed at an angle close to 90° will preferably be used.

Figure 4:
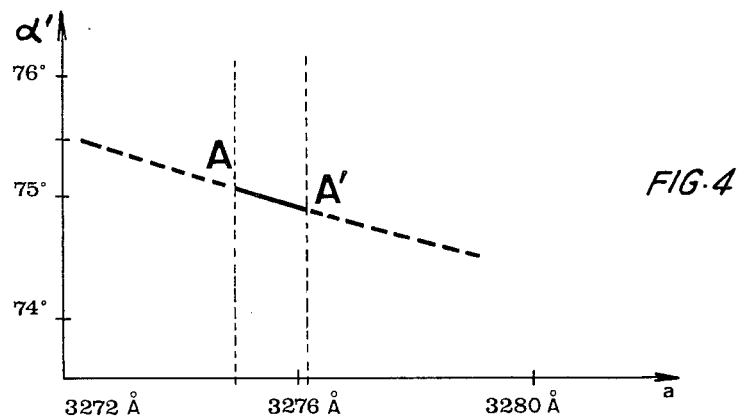
FIGS. 4 to 6 are graphs showing, for the arrangement of FIG. 3, the variation of the angle of deflection of the light beam as a function of the variation of the pitch of a grating of the grating assembly.
Figure 5:
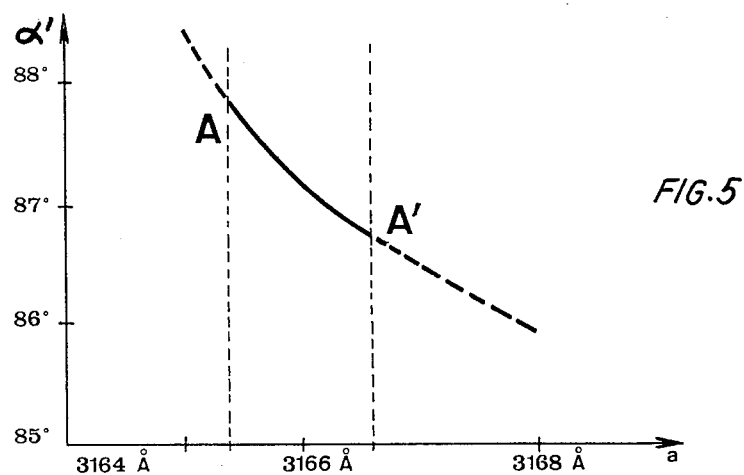
Figure 6:
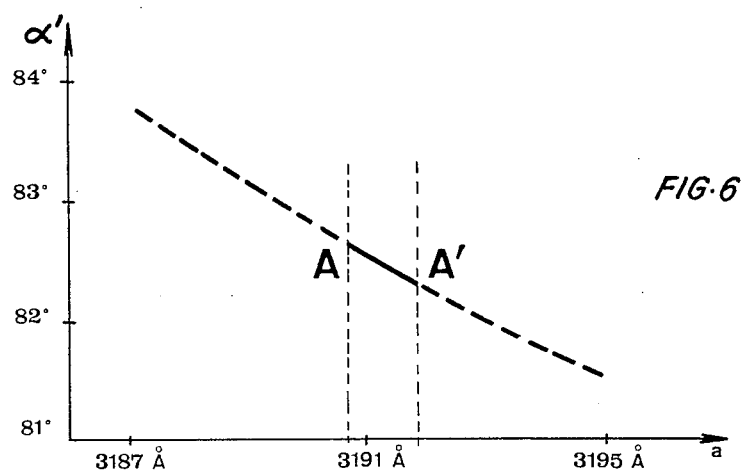

FIGS. 4 to 6 show the variation of the angle $\alpha'$ (and therefore the variation in the deflection angle) as a function of the variations of the pitch $a$ of the grating for an incident beam of wavelength 6328 A as a first order. The angles of beam incidence corresponding to FIGS. 4, 5 and 6, are respectively 75°, 82.5° and 90°; the angles $\alpha'$ are of the same order of magnitude. The variation in the pitch of the grating is caused by a variation in the intensity of the electrical field in which the piezo-electric substrate is positioned. Grating pitch variation is restricted in practice to the portions A – A' of the graphs in order to prevent cracking of the substrate (for example formed of a ceramic material). The substrate 1 can alternatively be a piezo-electric crystal.

The dimensions of the grating can be of any suitable magnitude, for example the substrate 1 giving the results shown in FIGS. 4 to 6 has a thickness of 1mm and a diameter of 25 mm, and is formed of PTZ 5H ceramic material; the pitch of the grating is 600 lines/mm, with operation in the fifth order.

The electrically-conductive layers of the grating assembly can for example be in the form of an aluminum coating.

The grating assembly described can be advantageously used in all applications of gratings in which it is desired to vary the pitch of the grating, for example as in deflectors, couplers, modulators and analysers.

We claim:
1. An optical modulator assembly comprising:
   a substrate possessing piezo-electric properties and having two opposite faces,
   electrically-conductive layers each carried by a respective one of said faces of the substrate, one of said layers having a reflective surface,
   a grating carried by the one of said two opposite faces of the substrate which bears said reflective layer,
   a light source for directing a beam of light at said grating, and
   means for applying a variable voltage between said electrically-conductive layers to set up in the substrate an electric field of variable strength and thereby cause variations in pitch of the grating so as to vary the direction in which the light beam is reflected from the grating.

2. An optical modulator assembly according to claim 1 wherein said two opposite faces of said substrate are parallel, and said grating is generally parallel to said faces.

3. An optical modulator assembly according to claim 1, wherein the grating is formed in a layer carried by one of the said two faces.

4. An optical modulator assembly according to claim 3, wherein the said layer is metallic and constitutes one of the said conductive layers, the grating being engraved therein.

5. An optical modulator assembly according to claim 3, wherein the said layer is composed of photo-polymerisable resin.

6. An optical modulator assembly according to claim 1, wherein the grating is covered by one of the said conductive layers.

7. An optical modulator assembly according to claim 1, wherein one of said layers is metallic and is applied directly to the said face of the substrate which is opposite the face which carries the grating.

* * * * *